J. S. SCOTT.
FISHING FLOAT.
APPLICATION FILED DEC. 11, 1916.
1,243,768.
Patented Oct. 23, 1917.
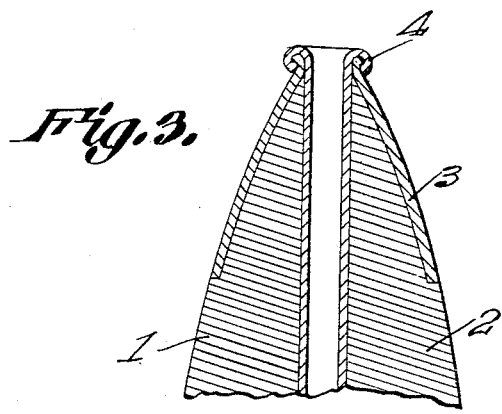
J. S. Scott
Witnesses
Inventor
by C. A. Snow & Co.
Attorneys

UNITED STATES PATENT OFFICE.

JOHN S. SCOTT, OF GREENVILLE, TEXAS.

FISHING-FLOAT.

1,243,768. Specification of Letters Patent. Patented Oct. 23, 1917.

Application filed December 11, 1916. Serial No. 136,263.

*To all whom it may concern:*

Be it known that I, JOHN S. SCOTT, a citizen of the United States, residing at Greenville, in the county of Hunt and State of Texas, have invented a new and useful Fishing-Float, of which the following is a specification.

The present invention appertains to fishing floats and the like, and it is the object of the invention to provide novel and improved means for finishing the ends of a fishing float of the type disclosed in my Patent No. 1,167,222 granted January 4, 1916, wherein the float has a longitudinal tube extending therethrough for the passage of the line.

The object of the invention is the provision of ferrules or caps for the ends of the float and its tube, to finish the ends of both the float and tube, whereby to protect them and to exclude water from between the adjacent walls of the tube and float, thereby avoiding decay.

It is also the object of the invention to provide a float having the improvements above indicated, and which at the same time is extremely simple and inexpensive in construction, as well as practical and efficient.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the float having the present improvements embodied therewith.

Fig. 2 is a perspective view of one of the ferrules or caps.

Fig. 3 is an enlarged longitudinal section of one end portion of the float.

The float 1 which is constructed of wood, cork or other buoyant material is of fusiform contour as illustrated, and is provided with a longitudinal tube 2 extending therethrough from end to end for the passage of the fishing line, as disclosed in said patent.

In carrying out the invention, a pair of conical ferrules or caps 3 of suitable metal or other material are fitted upon the ends of the float 1, and the smaller open ends of the ferrules embrace the end portions of the tube 2 which protrude from the float. The ends of the tube are beaded, as at 4, to engage over and under the smaller outturned ends of the ferrules 3, thereby providing a water tight joint, and since the ferrules 3 fit tightly upon the float, water cannot gain access to the bore of the float 1 in which the tube 2 is fitted. This will prevent interior decay of the float. The ferrules also serve to finish and protect the ends of the float and tube, and securely anchor the tube in place, preventing its longitudinal movement in the float.

Having thus described the invention, what is claimed as new is:

The combination with a fishing float of wood or equivalent material having a longitudinal bore extending from end to end, and a line receiving tube extending through said bore, of means to exclude moisture from said bore around said tube, including conical ferrules fitted upon the ends of the float and having their smaller ends embracing the ends of the tube and turned outwardly, the ends of the tube being beaded over the outturned ends of the ferrules, whereby to hold the ferrules tightly against the float to prevent leakage between the float and ferrules, said beaded ends of the tube engaging under said outturned ends of the ferrules.

In testimony that I claim the foregoing as my own, I have hereto affixed my signature in the presence of two witnesses.

JOHN S. SCOTT.

Witnesses:
J. L. MEBHEN,
H. E. NORTON.

Copies of this patent may be obtained for five cents each, by addressing the "Commissioner of Patents, Washington, D. C."